Sept. 13, 1966   C. M. L. BOURCIER DE CARBON   3,272,493
SHOCK ABSORBERS
Filed Aug. 26, 1964
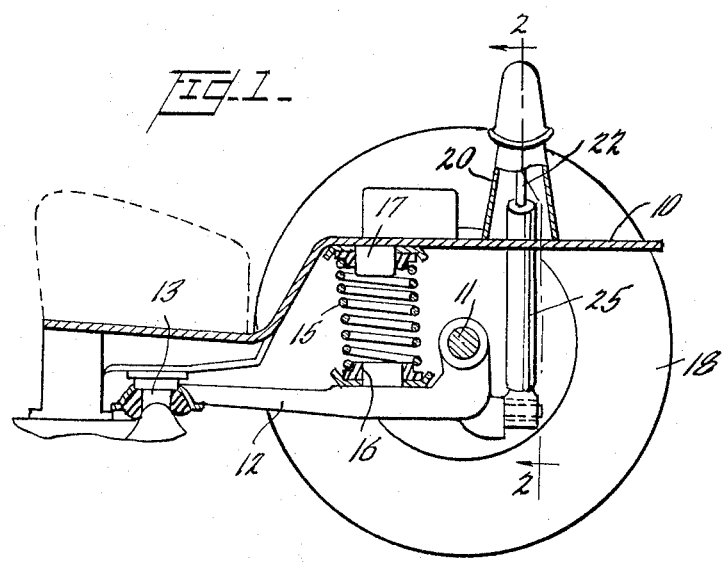
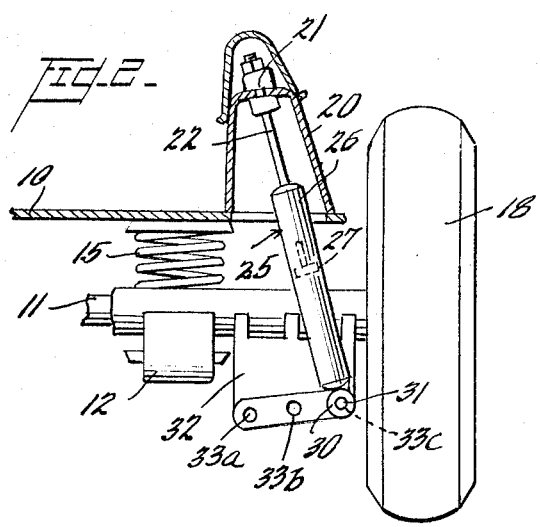
INVENTOR
C. M. L. Bourcier de Carbon
BY Watson, Cole, Grindle & Watson
ATTORNEYS

United States Patent Office 3,272,493
Patented Sept. 13, 1966

3,272,493
SHOCK ABSORBERS
Christian Marie Lucien Louis Bourcier de Carbon,
64 Blvd. Maurice-Barres, Neuilly-sur-Seine, France
Filed Aug. 26, 1964, Ser. No. 392,205
3 Claims. (Cl. 267—8)

This invention relates to shock absorbers for motor vehicles and the like, and more particularly to the installation thereof between the chassis and the wheel mounting.

The general object of the invention is the provision of a novel and improved adjustable mounting for a direct-acting piston-and-cylinder shock absorber, whereby the "hardness" or "softness" of the ride may be predetermined, not only in accordance with the preference of the occupant, but according to the nature of the roadway to be travelled.

In the case of known types of vehicle suspensions of this general class, the main bearing or supporting spring has the task of resiliently supporting that portion of the load which falls to its share; while the shock absorber, disposed separately but in general parallelism with the bearing spring, is adapted to absorb vibrations occurring between the chassis and the wheel mounting during travel through the conversion of vibration energy into heat energy. For this purpose hydro-pneumatic single tube shock absorbers have proven themselves highly advantageous, since in addition to other qualifications, they have the advantage that their predetermined energy absorbing ability remains practicaly unchanged and thus guarantees uniformly good riding comfort under normal travel conditions.

However, it has become apparent, that in many cases it is desirable to be able to adapt the absorbing effect of shock absorbers to the prevalent road conditions, as well as to individually different requirements of the particular user of the vehicle. Thus, for example, a driver who is inclined toward sport car driving will prefer a harder adjustment of the energy absorbing member which has its advantages especially when travelling on smoother roads. In contrast, a softer adjustment of the energy damping device is indicated where the vehicle has to travel frequently over rough roads or terrain, or where the driver himself prefers a softer ride. For that reason shock absorbers have already been proposed wherein, through the adjustment of the throttling openings in the shock absorber pistons or adjustment of the valve discs controlling said openings, the throttling effect and the energy damping ability of the shock absorber can be altered. Shock absorbers with such adjustable damping effects have, however, not been able to demonstrate wide acceptance in practice, a situation which first of all can be traced back to the fact that they have been of a relatively complicated construction and also they have not been sufficiently immune to break-down for practical use in vehicles.

It is therefore the principal object of the present invention to provide a vehicle suspension of the type already mentioned which is equipped with a shock absorber and wherein the effect of the shock absorber can be readily adjusted for the purpose of adapting it to prevalent conditions of travel, and most important where this purpose can be attained in a much more simple manner and by means which are completely reliable.

Thus, the invention in its preferred embodiments contemplates the provision of means for mounting the pivotal end points of the shock absorbers to dispose them in selective different angular positions in relation to the substantially vertical direction of oscillations between the wheel mounting and the chassis. As a result of this, the shock absorber will exert a different damping effect depending upon the particular selected angular position or oblique arrangement, without the necessity of making any kind of readjustment or replacement for the throttling or damping mechanism disposed interiorly of the shock absorber. As is well known, the damping effect of the shock absorber depends essentially on the ratio between the relative movement of the wheel vis-a-vis the chassis and on the corresponding relative movement of the piston of the shock absorber with relation to the shock absorber cylinder. Thus the damping effect is essentially inversely proportional to the square of the above-mentioned ratio.

Other objects and features of novelty will be apparent from the following specification, when read in connection with the accompanying drawings, in which one embodiment of the invention is illustrated merely by way of example.

In the drawings:

FIGURE 1 is a view chiefly in longitudinal vertical section of a wheel suspension installation embodying a shock absorber mounting according to the principles of the invention; and FIGURE 2 is a transverse sectional view taken substantialy on line 2—2 of FIGURE 1.

A fragmentary portion of the chassis of the vehicle is shown at 10 and the wheel mounting comprises essentially the axle 11 and the draft link or arm 12 having preferably an elastic pivotal connection 13 with a portion of the chassis of the car. A main supporting coil spring is shown at 15 being seated at 16 upon the link or arm 12 and similarly seated at 17 beneath the chassis 10. The wheel 18 is, of course, rotatably secured upon the axle 11 in the usual manner.

Within a portion 20 of the framing of the chassis 10 there is provided a preferably elastic pivot 21 for the upper end of the piston rod 22 of the shock absorber. Such elastic grommet connections are common in the art and need not be described in detail. The shock absorber designated generally by the reference numeral 25 has a cylinder 26 within which a piston indicated diagrammatically at 27 reciprocates within a body of appropriate damping fluid. The piston rod 22 is, of course, rigidly attached to the piston. Preferably and in the more specific scope of the invention, the shock absorber is of the hydro-pneumatic type.

At the lower end of the cylinder 26 of the shock absorber a connecting eye 30 is provided through which a pin 31 extends and of course appropriate elastic or grommet connections may be employed here.

Appropriately fixed to the axle housing 11 is a supporting bracket 32 and this bracket is provided with a series of optionally useable openings 33a, 33b and 33c. The primary opening 33a is disposed approximately vertically beneath the upper pivot point 21 of the shock absorber while the intermediate opening 33b is displaced transversely of the direction of movement of the vehicle outwardly of the initial opening 33a. The third opening 33c is still further displaced in an outward direction. Preferably, although not necessarily in all cases, the openings 33a, 33b and 33c are disposed on an arc of a circle centered on the upper connection 21. Of course, more openings than the three illustrated can be provided for a finer gradation of adjustment.

In the embodiment illustrated in FIGURE 2, the position of the shock absorber is the extreme outward one which illustrates the case of a soft adjustment of the shock absorber. Hence in this situation the vibrations from travel will cause a correspondingly shortened thrust of the shock absorber piston and thus the effective damping force of the shock absorber will be correspondingly less. In the adjustment where the shock absorber is secured at its lower end in the opening 33a, the vibrations occurring between the wheel mounting and the chassis during travel are transferred in full measure to the shock absorber. In other words they are dampened most strongly. This substantially vertical arrangement, therefore, corresponds to a "sport car adjustment."

If the shock absorber has been articulated to the central attaching hole 33b this will result in a normal setting for the damping force which is desired in most cases.

It is understood that instead of the attaching holes shown other selectable attaching elements can be provided, for example a series of pins adapted to fit the eye 30 of the shock absorber or any other equivalent alternative connections.

There has thus been described means provided in accordance with the present invention for adapting a shock absorber of fixed properties in a simple and operationally safe manner according to the travel conditions desired in any situation.

Various changes and modifications may be made in the embodiment illustrated and described herein without departing from the scope of the invention as defined by the following claims.

Having thus described the invention, what is claimed as new and desired to be secured by Letters Patent is:

1. In a motor vehicle of the class described, a chassis, a wheel mounting, a main suspension spring disposed between said chassis and the wheel mounting, a shock absorber disposed between the chassis and the wheel mounting and in general parallelism relative to said supporting spring, said shock absorber including a cylinder and a piston therein and the piston rod fixed to said piston and extending from one end of the cylinder, attaching means at opposite ends of said shock absorber, means pivotally connecting an upper end of said shock absorber to said chassis, and means connecting the lower end of said shock absorber with said wheel mounting, said last-named means comprising a plurality of selective connecting points of attachment aligned in a direction transverse to the direction of travel of the vehicle, whereby there is a choice of different angular positions of installation of said shock absorber in relation to the direction of vibratory movement between said chassis and said wheel mounting, in order to vary the hardness of the ride.

2. The vehicle as set forth in claim 1 in which said lower connecting means comprise a bracket attached to said wheel mounting and extending transversely to the direction of travel and provided with a series of holes spaced therealong and concentric with the upper point of attachment of the shock absorber, and pin connections are provided at the lower end of said shock absorber for engagement in selected ones of said holes.

3. The vehicle as set forth in claim 2 in which the shock absorber is a hydro-pneumatic shock absorber and in which the cylinder comprises the lower end portion thereof and the piston rod the upper end portion.

No references cited.

ARTHUR L. LA POINT, *Primary Examiner.*

R. M. WOHLFARTH, *Assistant Examiner.*